United States Patent [19]

Cripe et al.

[11] Patent Number: 5,651,139
[45] Date of Patent: Jul. 22, 1997

[54] PROTECTED SYSTEM PARTITION READ/WRITE ACCESS ON A SCSI CONTROLLED DASD

[75] Inventors: Jeffrey B. Cripe; Mitchell E. Medford; Michael R. Primm, all of Delray Beach; Sharon L. Sanders, Boynton Beach, all of Fla.

[73] Assignee: International Business Machines Corporation, Armonk, N.Y.

[21] Appl. No.: 173,521

[22] Filed: Dec. 23, 1993

[51] Int. Cl.$^6$ .................................................. G06F 12/14
[52] U.S. Cl. ....................... 395/490; 395/186; 395/439; 395/309; 380/4; 364/DIG. 1; 364/DIG. 2; 364/265.3; 364/23.84
[58] Field of Search .................. 364/200 MS File, 364/900 MS File; 395/400, 425, 186, 188.01, 490, 491, 181, 182.3, 477, 726, 857, 309; 380/4

[56] References Cited

U.S. PATENT DOCUMENTS

| | | | |
|---|---|---|---|
| 4,434,464 | 2/1984 | Suzuki et al. | 395/491 |
| 4,472,790 | 9/1984 | Burk et al. | 395/491 |
| 4,665,506 | 5/1987 | Cline et al. | 365/189.01 |
| 4,677,546 | 6/1987 | Freeman et al. | 395/413 |
| 4,937,861 | 6/1990 | Cummins | 380/2 |
| 4,947,318 | 8/1990 | Mineo | 354/200 |
| 4,984,149 | 1/1991 | Iwashita et al. | 395/404 |
| 5,022,077 | 6/1991 | Bealkowski et al. | 380/4 |
| 5,063,496 | 11/1991 | Dayan et al. | 395/700 |
| 5,128,995 | 7/1992 | Arnold et al. | 380/4 |
| 5,136,711 | 8/1992 | Hugard et al. | 395/700 |
| 5,136,713 | 8/1992 | Bealkowsi et al. | 395/700 |
| 5,214,695 | 5/1993 | Arnold et al. | 380/4 |
| 5,218,701 | 6/1993 | Miyazaki | 395/700 |
| 5,341,422 | 8/1994 | Blackledge, Jr. et al. | 380/4 |
| 5,375,243 | 12/1994 | Parzych et al. | 395/491 |
| 5,388,156 | 2/1995 | Blackledge, Jr. et al. | 380/4 |
| 5,402,492 | 3/1995 | Goodman et al. | 380/25 |
| 5,414,852 | 5/1995 | Krammer et al. | 395/700 |

OTHER PUBLICATIONS

IBM OS/2 Storage Subsystem Device Driver Reference, Second Edition, Apr. 1993.
"Addition of an Industry–Standard Personal–Computing Capability to a Host–Attached Terminal", IBM Technical Disclosure Industry Bulletin, New York, U.S., Aug., 1985, pp. 978–990.
"Ctrl–Alt–Ins Key Sequence to Invoke the System Partition", IBM Technical Disclosure Bulletin, New York, U.S., Aug., 1990, pp. 318–319.
"Preventing Access to a Personal Computer", IBM Technical Disclosure Bulletin, New York, U.S., Sep., 1992, pp. 98–100.

Primary Examiner—Eddie P. Chan
Assistant Examiner—Hiep T. Nguyen
Attorney, Agent, or Firm—Jeffrey S. LaBaw; Andrew J. Dillon

[57] ABSTRACT

A method and system for providing access to a protected partition of a direct access storage device in a data processing system which includes a direct access storage device, an adapter that commands I/O of the storage device and also contains a protection mechanism that restricts access to a memory partition on the storage device, an adapter device driver for controlling the adapter, and a system block device driver for transferring I/O commands to the system partition from the operating system to the adapter device driver. The method comprises the steps of receiving a request to perform a read or write to a protected memory partition, generating a command data block directing the storage device to perform the read or write, and generating a passthru command containing the command data block that directs the adapter to send the command data block without enforcing the protection of the memory partition. The method continues by sending the passthru command to the adapter which then passes the command data block on to the storage device to be executed without enforcing the memory partition protection.

10 Claims, 2 Drawing Sheets

PROTECTED SYSTEM PARTITION READ/WRITE ACCESS ON A SCSI CONTROLLED DASD

BACKGROUND OF THE INVENTION

1. Technical Field

The present invention relates in general to accessing a protected memory partition on a SCSI controlled direct access storage device, and in particular to accessing a protected system partition contained on a SCSI controlled direct access storage device as part of a IBM PS/2 system running the operating system OS/2.

2. Description of the Related Art

Many personal computer systems use operating environments where IBM SCSI architecture provides an interface between the basic computer system hardware and peripheral I/O devices such as a Direct Access Storage Device (DASD). A Small Computer System Interface (SCSI) is an input and output bus that provides a standard interface between the operating system and peripheral devices. The SCSI is attached to the personal computer system by a SCSI adapter which provides the hardware and software required for SCSI communications. On IBM PS/2 systems running OS/2, version 2.0 or later, access to SCSI devices is performed by device manager or device driver calls to the peripheral device's SCSI Adapter Device Driver (ADD). The SCSI ADD then issues Subsystem Control Blocks (SCBs) to the appropriate SCSI adapter for processing. The SCSI adapter then issues Command Descriptor Blocks (CDBs) to the appropriate SCSI device to perform the required action.

Personal computer systems generally contain a Direct Access Storage Device (DASD) which holds data and instruction code to be utilized by the personal computer. A DASD is typically a memory device such as a hard disk-drive device, a floppy disk-drive device or a large RAM memory which emulates a disk drive. These memory devices provide the CPU with direct access to a large space of memory separated into a fixed set of regions known as partitions. One partition is typically dedicated to the system's utility files. This "system partition" contains files such as adapter definition files, initial microprogram load files, Power-On Self Test (POST), and Basic Input/Output System (BIOS).

With the application of power at start-up of a modern personal computer, the CPU executes various routines required to boot the system. Primary among these routines are the POST and BIOS files. When an error is detected during POST, the system partition is booted to provide access to the system programs needed to resolve the error condition. The error correction programs correct the error and restart the computer system. If no POST error is detected on re-boot, POST and BIOS "fence" off the system partition in order to protect it from the operating system, the master partition table is loaded, and the operating system is loaded into the personal computer system.

The system partition is locked from access at operating system level by the use of a "fencing" feature provided by SCSI adapters. The fence is built to provide protection to the system partition code and data from routines executing at the operating system level, and to provide a location for the system partition without reserving one of the four partitions available through the master partition table. The fence is a particular address designating a portion of memory over (or under, depending on the memory scheme) which a reference to DASD memory is rejected as an illegal reference to a protected memory partition. The fence is set by the POST and cannot be moved after operating system load without using undocumented features of the SCSI adapter.

to se the fence, the POST code issues a Set Max Logical Block Address (LBA) SCB to the SCSI adapter controlling the DASD. The Set Max LBA SCB is an undocumented SCSI adapter command for the IBM SCSI Adapter. The Set Max LBA SCB delivers the fence address to the DASD. The fence provides a protected location for the system partition in the storage device's memory. All subsequent SCBs sent to the DASD involving device size are based on the premise that the device capacity is equal to the total capacity of the storage device less the system partition size. Any SCB issued requesting an I/O to the DASD at an address over the fence will not be processed by the SCSI adapter. It can be seen that by the time the operating system load is started, POST and BIOS have hidden the system partition so it is invisible to the operating system. The particular method of fencing described here is presented in detail in U.S. Pat. No. 5,128,995.

While this fencing feature is extremely effective at protecting the system partition from unintentional or harmful I/O, there is occasionally a need to gain access to information in the system partition while the operating system is working. For example, the user may require access to adapter definition files contained in the system partition to assist in the display of adapter configuration data. One method of allowing access to the system partition is to move the fence after Initial Program Load by issuing a new Set Max LBA SCB to the SCSI adapter. This introduces conflicts with the regular DASD subsystem during normal operations under a multi-tasking operating system such as OS/2. Another method would be to boot a back-up version of the system partition from a floppy drive. This method, although the currently published method for accessing the system partition on the PS/2, is rather awkward and time-consuming. This published method is as follows:

Use a diskette that contains a backup of the system partition.

Under DOS, perform a DEL *.* on the diskette (do not erase hidden files).

Copy a DOS "COMMAND.COM" file to the diskette.

Copy FDISK, and any other utilities needed to look at the system partition, to the diskette.

Boot from this diskette.

The C: drive will now be system partition running DOS.

Therefore, the only method known previously for accessing the protected system partition was for the system POST to deactivate the protection and offset accesses to the drive to the beginning of the protected region. This mechanism, however, would only allow access to the system partition by booting from a special diskette, causing a POST failure, or hitting a special key sequence at the system boot time. Also, when the partition was being accessed the rest of the disk containing the system partition could not be accessed concurrently. Thus, prior to the present invention, there was no simple way to access the system partition on PS/2 products running under the OS/2 operating system.

SUMMARY OF THE INVENTION

It is therefore an object of the present invention to provide access to a protected memory partition on a SCSI controlled direct access storage device.

It is another object of the present invention to provide access to a protected system, partition contained on a SCSI controlled direct access storage device, as part of the IBM PS/2 system, while running the operating system OS/2.

The foregoing objects are achieved as is now described. According to the present invention, a method and system for providing access to a protected partition of a direct access storage device where the system includes the direct access storage device, an adapter that commands I/O of the storage device, and also contains a protection mechanism that restricts access to a memory partition on the storage device, an adapter device driver for controlling the adapter, and a system block device driver for transferring I/O commands to the system partition from the operating system to the adapter device driver. The method comprises the steps of receiving a request to perform a read or write to a protected memory partition, generating a command data block directing the storage device to perform the read or write, and generating a passthru command containing the command data block that directs the adapter to send the command data block without enforcing the protection of the memory partition. The method continues by sending the passthru command to the adapter which then passes the command data block on to the storage device to be executed without enforcing the memory partition protection.

The present invention allows clear and easy access to the system partition while the operating system is running on a computer system utilizing IBM SCSI architecture. System partition access is provided without effecting the integrity of the system partition protection, without halting the operating system, and without requiring the use of a reference diskette.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

The present invention is a method for accessing data in a fenced area on a SCSI compatible memory device while the computer's operating system is running and without moving the fence or affecting the storage device subsystem integrity. The invention can be used in any operating environment where IBM SCSI architecture, or an equivalent architecture, is supported. In particular, the method of the present invention provides a way of circumventing an I/O protection feature such as a fencing feature used to affect a partition of external memory such as the system partition. The following description of the preferred embodiment is described in terms of its implementation in an IBM PS/2 personal computer system operating on OS/2. However, it should be understood that the invention is not intended to be limited to its application in or OS/2.

Figure 1:
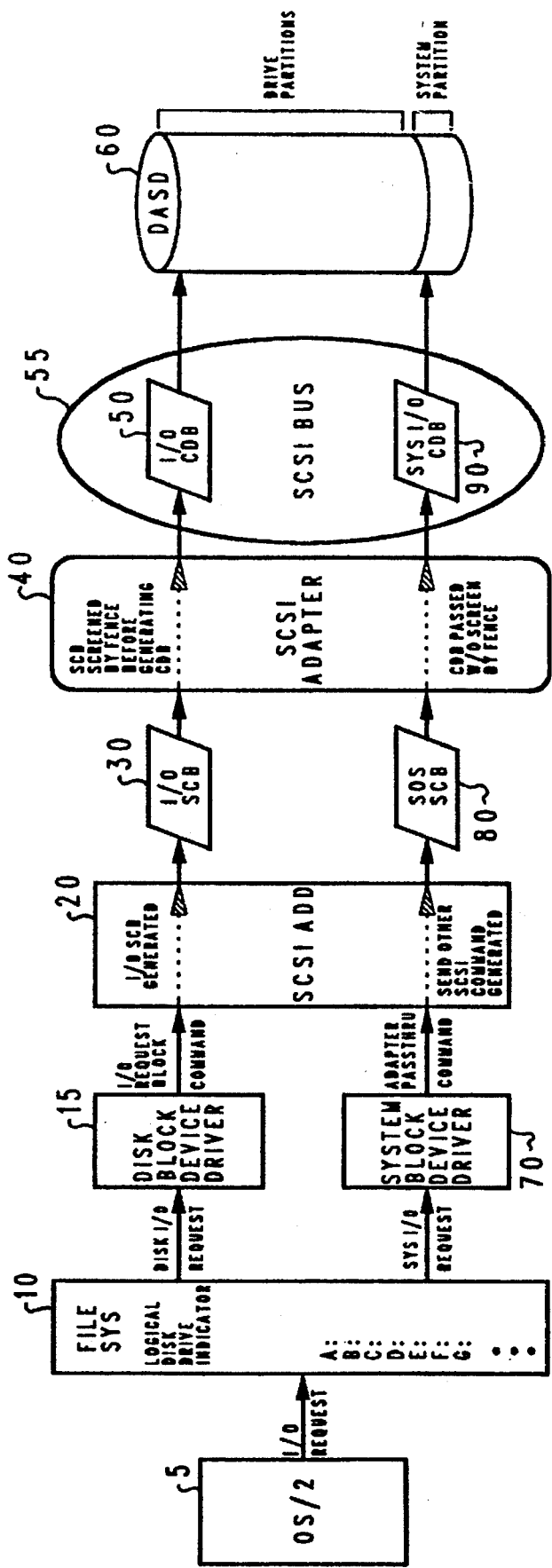
FIG. 1 depicts a flow diagram showing the transfer of commands between elements of a PS/2 computer system when reading or writing to a DASD in accordance with a preferred embodiment of the present invention.

With reference now to the figures and in particular with reference to FIG. 1, there is depicted a data flow diagram showing the transfer of commands between blocks representing elements of a PS/2 computer system when reading or writing to a DASD in accordance with a preferred embodiment of the present invention. The basic read/write operation of OS/2 on a PS/2 to a DASD is well documented and is widely understood. A high level description of this read/write, or I/O operation, can be followed with reference to FIG. 1.

The OS/2 operating system 5 accesses data in a particular partition of the DASD 60 by making I/O calls to a disk drive, identified by a letter, in a file system 10. This file system 10 contains a listing of the logical disk drives designating memory partitions available on the DASD 60 and other external storage devices. File system 10 directs the I/O request to the block device driver provided to the operating system for controlling the I/O to that logical disk drive letter. A device driver is a file that contains the code needed to attach and use an I/O device by controlling the interface between the I/O device and the computer system's processor.

To carry out a read or write to a logical disk drive contained in the drive partitions of the DASD 60, a disk I/O request is input into Disk Block Device Driver 15. Disk block device driver 15 generates an I/O Request Block Command in a form executable by a SCSI ADD 20. Disk block device driver 15 may be designed to generate I/O request blocks for only one logical drive, or it may be designed to receive and execute I/O requests to multiple logical drives.

The SCSI ADD 20 receiving the I/O request block embodies the code required to control and use the SCSI adapter connecting the computer system to the logical drive partitions on the external DASD 60. SCSI ADD 20 is a device driver which interprets I/O commands from the operating system (in this case OS/2) into Subsystems Control Blocks (SCBs) readable by a SCSI adapter of IBM SCSI architecture. SCSI ADD 20 generates an I/O SCB 30 directed to the logical drive partition referenced in the I/O request block. The I/O SCB 30 is sent to the IBM architecture SCSI adapter 40 to be executed. Before executing the I/O SCB, SCSI adapter 40 compares the physical address (the relative LBA offset by the starting Relative Block Address) with the fence address set in the adapter by the POST. If the I/O physical address is greater than or equal to the fence the address is an illegal reference to the system partition which will be rejected by SCSI adapter 40 as a nonexecutable command. After being screened by the fence, SCB 30 is converted into a standard executable SCSI CDB, shown as I/O CDB 50. CDB 50 is a standard I/O device command as provided by the IEEE standard for SCSI communications. CDB 50 is sent over a standard SCSI bus 55 to DASD 60. DASD 60 executes CDB 50 by accessing the physical address within the referenced logical drive partition.

The present invention of accessing data in a protected system partition while running OS/2 is embodied in System Block Device Driver 70. System block device driver 70 presents the system partition to the operating system 5 as another logical disk drive in the file system 10. The user of the operating system 5 reads or writes data in the system partition disk drive as on any other logical drive. An "I/O request" from OS/2 5 to the system partition logical drive letter results in file system 10 sending a System Drive I/O Request to System Block Device Driver 70. System Block Device Driver 70 generates a standard CDB directing DASD 60 to carry out the read or write requested in the "SYS I/O Request." System block device driver 70 then builds an adapter passthru command with a data block containing the generated CDB which, when executed by SCSI ADD 20, requires SCSI adapter 40 to send out the generated CDB over the SCSI bus 55 to DASD 60 as a raw SCSI command, and to not enforce the fence by screening the command. In other words, because SCSI adapter 40 will not be converting an SCB to a CDB, SCSI adapter 40 will blindly place the generated CDB contained in the adapter passthru command data block to DASD 60 without screening the SCSI command for an I/O request to the system partition.

After building the command, the adapter passthru command is issued to SCSI ADD 20 as an Adapter Passthru I/O Request Block, as defined by OS/2, with a command modifier directing SCSI ADD 20 to execute the data block accompanying the adapter passthru command as a standard CDB. As implemented in PS/2 where SCSI ADD 20 is an IBM2SCSI.ADD which is included in OS/2 2.00 and later versions the adapter passthru command would be configured as an ADAPTER_PASSTHRU Input/Output Request Block (IORB) with a command modifier of EXECUTE_CDB and a data block filled with the generated CDB. This ADAPTER_PASSTHRU IORB is a command block specific to OS/2 and can be found in IBM OS/2 Storage Device Driver Reference, Section "DASD, SCSI, CD-ROM, Device Manager Interface Specification".

Executing the adapter passthru command in SCSI ADD 20 results in a Send Other SCSI Command (SOS) being generated. This Subsystem Control Block (SCB) command is used to send any SCSI command not supported by the adapter 40 directly to the SCSI device. The CDB to be issued is placed at the end of the SOS SCB. The Send Other SCSI Command is a standard SCB supported by SCSI adapters of IBM SCSI architecture. This command was designed to deliver commands to non-standard I/O devices other than basic memory devices such as a DASD. This catch-all command allows a SCSI adapter to pass commands from the operating system to SCSI devices such as tape drives, CD ROMs and network devices that the SCSI adapter 40 does not support directly. The SOS SCB command is documented for PS/2 in the IBM Technical Reference Manual PS/2 Micro Channel SCSI Adapter With Cache at page 55.

SCSI ADD 20 generates the Send Other SCSI Command using the CDB generated by system block device driver 70 and placed in the adapter passthru command. This SCB command is sent as SOS SCB 80 to SCSI adapter 40 to be executed. SCSI adapter 40 processes SOS SCB 80 in a unique way to generate SYS I/O CDB 90. Rather than generating the CDB by processing the SCB, the generated CDB is stripped from SOS SCB 80 and then issued directly to DASD 60 via SCSI bus 55 as CDB 90. Because of this unique feature of the Send Other SCSI Command, the SYS I/O CDB 90 containing an I/O request to the system partition passes through SCSI adapter 40 without being screened by the fencing protection mechanism. DASD 60 executes CDB 90 as any other CDB arriving from the SCSI bus. Because the fence is enforced at SCSI adapter 40, DASD 60 is not aware that the I/O request is to a restricted partition.

As can be seen from the above description, the present invention allows the data in the protected system partition to be accessed while running OS/2. Because the SCSI adapter passes the CDB to the SCSI device without disabling or dismantling the fencing function, the I/O is accomplished in the system partition without affecting the protection mechanism in any way. This means that other SCBs being processed, such as I/O SCB 30, are still subject to the fencing function and will not be affected by the CDB accessing the system partition. Applications like the System Information Tool currently preloaded with OS/2 2.00 will use this invention to access Adapter Definition Files to assist in the display of adapter configuration data. This invention also facilitates the development of remote Initial Microcode Load and flash updating.

Figure 2:
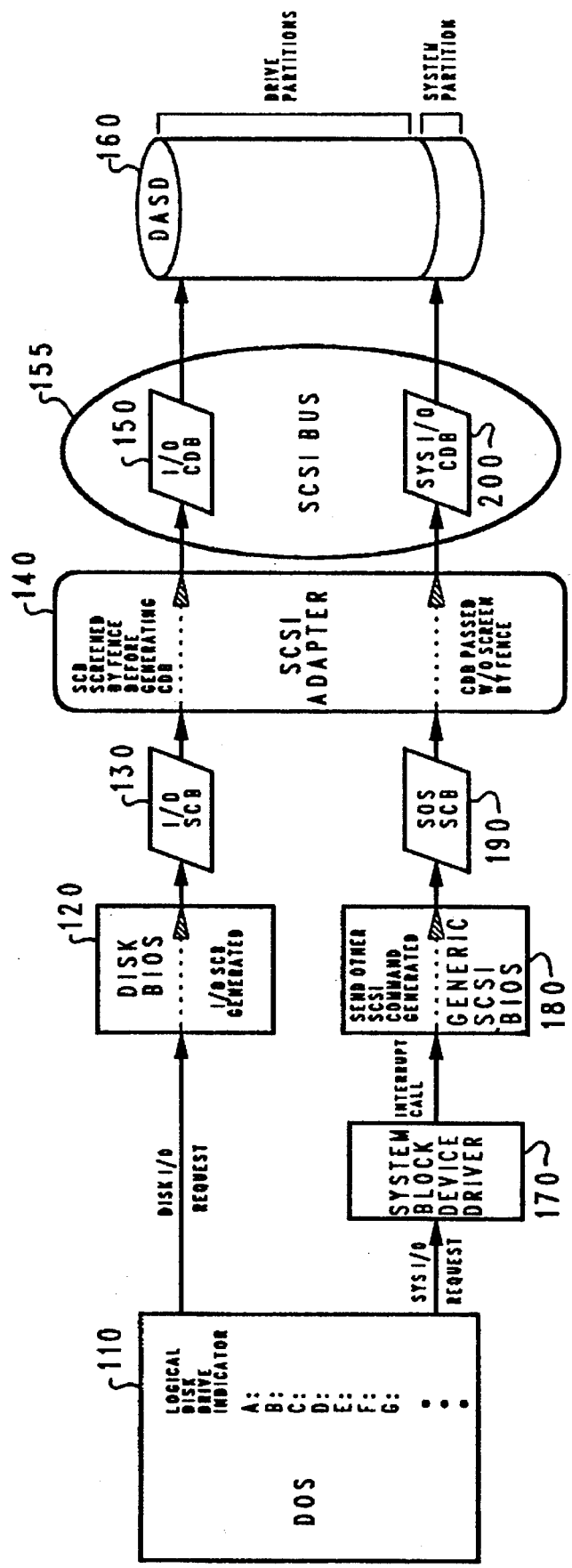
FIG. 2 depicts a flow diagram of the transfer of commands between elements in a personal computer system having IBM SCSI architecture and operating on DOS when reading or writing to a DASD in accordance with a preferred embodiment of the present invention.

Referring now to FIG. 2, there is depicted a flow diagram of the commands transferred between elements of a personal computer system implementing an IBM SCSI architecture, operating on DOS, and capable of accessing a protected system partition in accordance with a preferred embodiment of the present invention. DOS operating system 110 makes read or write calls to logical disk drives contained in external memory by issuing I/O request commands to the BIOS device driver controlling the external DASD. Here, an ordinary disk I/O request to a logical disk drive contained in the drive partitions of DASD 160 is presented to disk BIOS 120. Disk BIOS 120 is a device driver dedicated to handling read/write requests to an external DASD. This driver is commonly referred to in the art as an "INT 13" BIOS and is found in the IBM Personal System/2 and Personal Computer BIOS Interface Technical Reference, Page 2-IN13F-1. Disk BIOS 120 generates the appropriate I/O SCB 130 to be issued to SCSI adapter 140. At startup of the personal computer system, POST had set the fence in SCSI adapter 140 to protect the system partition contained in DASD 160. I/O SCB 130 is screened by the fence in SCSI adapter 140 to determine if it orders an I/O of the system partition. If the I/O address does not exceed the fence, SCSI adapter 140 generates I/O CDB 150 which commands DASD 160 to perform the I/O operation requested by DOS operating system 110. I/O CDB 150 is then sent out over SCSI bus 155 to DASD 160 to be executed.

The present invention for this preferred embodiment is represented in System Block Device Driver 170. This device driver presents DOS operating system 110 with a logical disk drive representing the system partition for use as a standard logical disk drive. DOS 110 issues a read or write command to the system partition logical disk drive by sending "SYS I/O Request" to System Block Device Driver 170. System block device driver 170 generates a CDB, "SYS I/O CBD 200", directing DASD 160 to perform an I/O at an address within the system partition. An interrupt is then issued calling Generic SCSI BIOS Device Driver 180. Generic SCSI BIOS 180 is another standard device driver provided by DOS or the SCSI adapter commonly called by an interrupt "INT-4B" and can be found in the IBM Personal System/2 and Personal Computer BIOS Interface Technical Reference, Page 2-IN4B-1 under the "SCSI Devices" service. This service is a generic SCSI interface which provides an interface with DOS for SCSI devices not supported by INT-13. The interrupt INT-4B is sent with a call to the "SCSI Devices" "Send SCB to Device" function. Generic SCSI BIOS 180 generates a Send Other SCSI SCB using the generated SYS I/O CDB 200 as its data block, and issues this SCB as SOS SCB 190 to SCSI adapter 140. SCSI adapter 140, being of IBM SCSI design, executes SOS SCB 190 by sending the CDB contained in the SCB's data block out over SCSI bus 155 without screening it by the fence. DASD 160 executes this I/O CDB 200 by performing the read or write operation in the system partition as requested by DOS 110.

It can be seen that the present invention overcomes the difficulties of prior methods for accessing the system partition as follows. First, the system partition can be accessed without any loss of access to the other areas of the DASD. Second, the technique does not affect the state of the DASD subsystem. This prevents problems for the file system and operating system in accessing the data on other portions of the DASD containing the partition. Third, the method can potentially be used under any operating system environment without bringing the system down for a special reboot.

Although the preferred embodiment has been described as it would be implemented in a PS/2 with an operating system of OS/2, it will be appreciated by those skilled in the art that the concept of using the Send Other SCSI Command SCB to deliver read/write CDBs, as opposed to the Read and Write SCBs, directly to a SCSI device to circumvent the fencing of a system partition can be used in any operating environment where IBM SCSI architecture is supported. Further, it is intended, and those skilled in the art will recognize, that the present invention disclosed here is not to be limited to SCSI architecture. The invention discloses a method for utilizing a passthru command which allows a raw device command to be sent through the protection mechanism of an intelligent adapter to generate device commands for controlling a peripheral device regardless of the peripheral device interface used for communication between the personal computer and the peripheral device. Moreover, while the invention has been particularly shown and described with reference to a preferred embodiment, it will be understood by those skilled in the art that various changes in form and detail may be made therein without departing from the spirit and scope of the invention.

What is claimed is:

1. A method in a data processing system of reading and writing to a system partition on a SCSI controlled DASD protected by a SCSI adapter address fencing mechanism, the SCSI adapter being controlled by an adapter device driver receiving I/O commands from multiple block-device-drivers, the method comprising said data processing system implemented steps of:

receiving an I/O request to a memory location contained in the system partition;

generating a SCSI Command Data Block requesting an I/O of the memory location in the system partition;

generating an adapter passthru command, containing the generated SCSI Command Data Block in data field, commanding that the enclosed SCSI Command Data Block be sent to the DASD;

sending the adapter passthru command to the SCSI adapter device driver;

generating a PS/2 Micro Channel SCSI Adapter Send Other SCSI subsystem command block containing the Command Data Block as the data block;

sending the Send Other SCSI subsystem command block to the SCSI adapter; and sending the Command Data Block over the SCSI bus to the DASD for execution of the I/O request.

2. A method in a data processing system of reading and writing to a system partition on a SCSI controlled DASD protected by a SCSI adapter address fencing mechanism according to claim 1, wherein the adapter device driver is an IBM2SCSI.ADD.

3. A method in a data processing system of reading and writing to a system partition on a SCSI controlled DASD protected by a SCSI adapter address fencing mechanism according to claim 2, wherein the adapter passthru command is an OS/2 Storage Device Driver ADAPTER_PASSTHRU Input/output Request Block with a command modifier of EXECUTE_CDB.

4. A method in a data processing system of reading and writing to a system partition on a SCSI controlled DASD protected by a SCSI adapter address fencing mechanism according to claim 1, wherein the command data block is formatted as an IEEE standard SCSI Command Data Block communication.

5. A method in a data processing system of reading and writing to a system partition on a SCSI controlled DASD protected by a SCSI adapter address fencing mechanism according to claim 1, further comprising the step of providing a logical drive identifier which represents the protected memory partition, and wherein the received request directs the I/O operation to the logical drive identifier.

6. A method in a data processing system of reading and writing to a system partition on a SCSI controlled DASD protected by a SCSI adapter address fencing mechanism according to claim 3, wherein the identifier is provided to an operating system.

7. A method in a data processing system of reading and writing to a system partition on a SCSI controlled DASD protected by a SCSI adapter address fencing mechanism according to claim 1, wherein the step of generating a command data block further includes addressing a particular memory location in the protected memory partition on which the I/O operation will be executed.

8. A method in a data processing system of reading and writing to a system partition on a SCSI controlled DASD protected by a SCSI adapter address fencing mechanism according to claim 7, wherein the memory location has a physical address equal to a logical block address offset by a relative block address of the protected memory partition.

9. A method in a data processing system of reading and writing to a system partition on a SCSI controlled DASD protected by a SCSI adapter address fencing mechanism according to claim 8, wherein the relative block address represents the memory device's maximum capacity minus the size of the protected memory partition.

10. A method in a data processing system of reading and writing to a system partition on a SCSI controlled DASD protected by a SCSI adapter address fencing mechanism according to claim 1, wherein the I/O operation is a read/write operation.

* * * * *

UNITED STATES PATENT AND TRADEMARK OFFICE
CERTIFICATE OF CORRECTION

PATENT NO. : 5,651,139
DATED : July 22, 1997
INVENTOR(S) : Cripe et al.

It is certified that error appears in the above-indentified patent and that said Letters Patent is hereby corrected as shown below:

Column 2, line 5: change "to se" to --To set--

Signed and Sealed this

Twenty-first Day of October 1997

Attest:

BRUCE LEHMAN

*Attesting Officer*  *Commissioner of Patents and Trademarks*